United States Patent [19]

Sobotta et al.

[11] 4,170,409
[45] Oct. 9, 1979

[54] STILL PROJECTOR WITH COVER

[75] Inventors: Reinhard Sobotta; Dieter Mankau, both of Brunswick, Fed. Rep. of Germany

[73] Assignee: Rollei-Werke Franke & Heidecke, Brunswick, Fed. Rep. of Germany

[21] Appl. No.: 829,155

[22] Filed: Aug. 30, 1977

[30] Foreign Application Priority Data

Sep. 9, 1976 [DE] Fed. Rep. of Germany ....... 7628239

[51] Int. Cl.² ............................................. G03B 21/14
[52] U.S. Cl. .................................................. 353/119
[58] Field of Search ............... 353/119, 122, 107, 112, 353/113, 114–118; 312/20

[56] References Cited

U.S. PATENT DOCUMENTS

| 2,492,807 | 12/1949 | Marcus et al. | 312/20 |
| 2,998,750 | 9/1961 | King | 353/116 X |
| 3,228,132 | 1/1966 | Wiklund | 353/116 X |
| 3,743,401 | 7/1973 | Johannsen et al. | 353/119 X |
| 3,809,469 | 5/1974 | Denis et al. | 353/116 X |

FOREIGN PATENT DOCUMENTS 2041434 2/1972 Fed. Rep. of Germany ........... 353/116

Primary Examiner—Harry N. Haroian
Attorney, Agent, or Firm—Stonebraker, Shepard & Stephens

[57] ABSTRACT

A still projector with a magazine guide channel, a projection lens, and a manual electrical switch has a cover that encloses all these components and fits closely in a recess in the housing. The cover is preferably shaped to fit the external contour of the housing and has a first plate covering the projection lens and one end of the magazine channel, a second plate covering a switch and the other end of the magazine channel, and a panel extending between the two plates and covering the top of the magazine channel.

3 Claims, 3 Drawing Figures

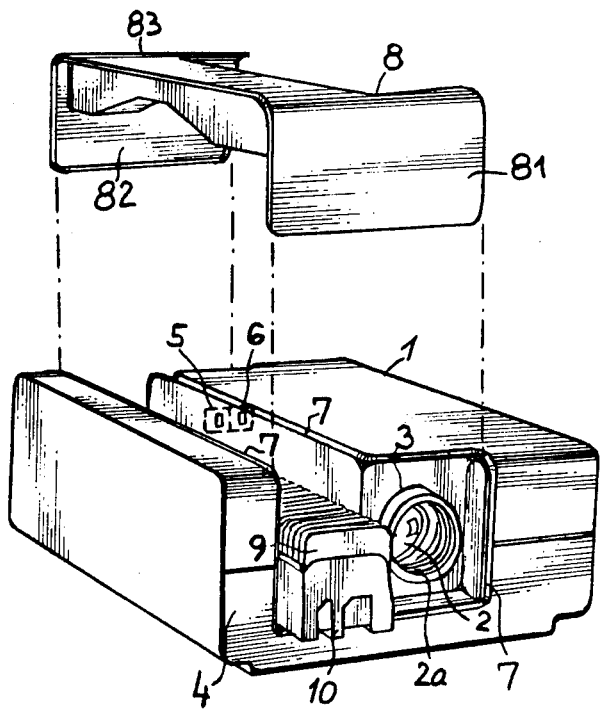

STILL PROJECTOR WITH COVER

BACKGROUND OF THE INVENTION

The invention relates to a still projector of the type that has a projection lens extending slightly outward from an aperture in a projector housing, and a magazine guide parallel with the projection lens and formed in an open channel in the housing for reception of a magazine loaded with slides. Such a projector also has at least one manual switch for an electrical system, and usually two manual switches for the projection lamp and the projector electrical system respectively.

The invention involves recognition of the advantages of a cover for enclosing the magazine guide channel, the projection lens, and any manual switches, and the invention also involves a particularly advantageous configuration of a cover that protects projector parts, allows carrying of a magazine full of slides in the projector, and prevents accidental operation of the projector switches. The invention also aims at simplicity, economy, convenience, and reliability in a simple projector cover accomplishing several purposes.

SUMMARY OF THE INVENTION

The invention applies to a still projector having a housing, a projection lens extending slightly outward from an aperture in the housing, a magazine guide parallel with the projection lens and formed in an open channel in the housing, and at least one manual switch for the electrical system of the projector. The invention includes a cover shaped to enclose the projection lens, the magazine guide channel, and the switch, and the housing has a recess shaped to receive the perimeter of the cover. The cover is shaped to fit in the recess and be retained on the projector, and the cover is manually insertable into and removable from the recess. The cover preferably includes a first plate covering the projection lens and one end of the magazine guide channel, a second plate opposite the first plate and covering the other end of the magazine guide channel and the switch, and a panel extending between the first and second plates and covering the top of the magazine guide channel. The cover preferably fits the external contour of the projector housing, eliminates the need for any dust cover, securely encloses a magazine full of slides for transport within the projector, and prevents accidental energizing of the projection lamp when the projection lens is covered. The cover is also preferably formed as a single piece that is conveniently mounted on or removed from the projector housing manually.

DRAWINGS

DETAILED DESCRIPTION

Figure 1:
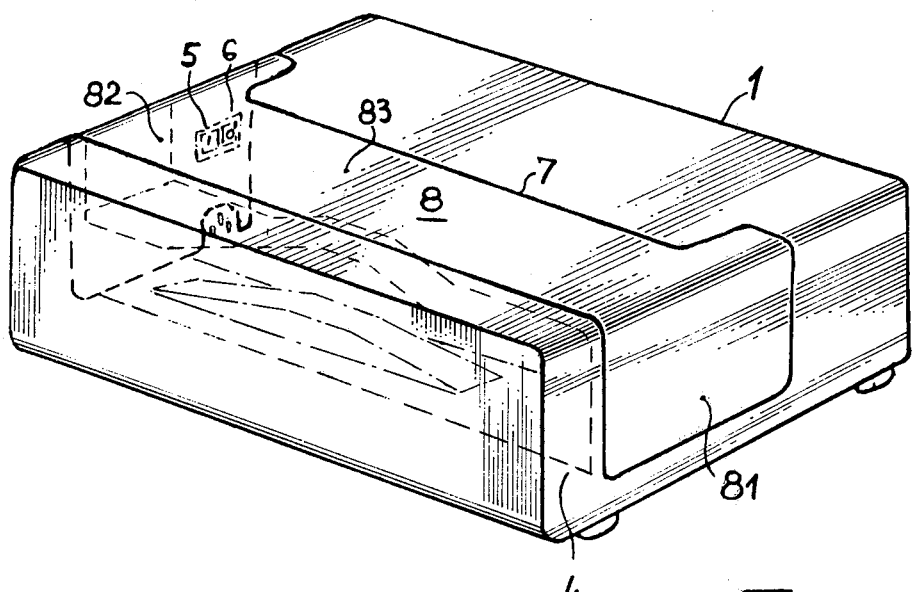
FIG. 1 is a perspective view of a preferred embodiment of the inventive projector having a cover enclosing projector components.

The illustrated preferred embodiment of the inventive projector has a housing 1 having a projection lens 2 arranged within a mount 2a that slightly projects from an aperture 3 in housing 1. Parallel to the projecting lens and formed within an open channel in the housing is a magazine guide 4 that is generally U-shaped along a channel extending across housing 1 to be open at both ends and along the top for receiving and moving a magazine 10 filled with slides 9. On the side of the projector opposite the projecting lens is a manually operable switch 5 for switching the projector electrical system on and off, and a manual switch 6 for switching the projection lamp (not shown) on and off.

A recess 7 is formed in housing 1 around the projection lens aperture 3, all around the magazine guide 4, and around the region of manual switches 5 and 6. The perimeter of cover 8 is manually insertable into recess 7 to be retained on the projector by its fit in recess 7, and cover 8 is manually removable from recess 7.

As best shown in FIG. 1, cover 8 is shaped to fit the external contour of housing 1 to close the openings in housing 1. Cover 8 thus serves as a dust protector and eliminates the need for any dust cover, and it simultaneously covers projection lens 2 and switches 5 and 6 to eliminate the need for a lens cover and to insure that the projector lamp is not energized with the lens covered. Cover 8 also retains slides 9 securely within a magazine 10 in magazine guide 4 as explained more fully below.

Figure 2:
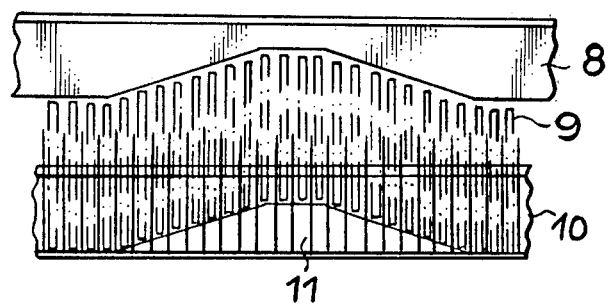
FIG. 2 is a fragmentary view of the projector of FIG. 1, showing how the cover fits over slides on a slide lifting ramp in the magazine guide.
Figure 3:
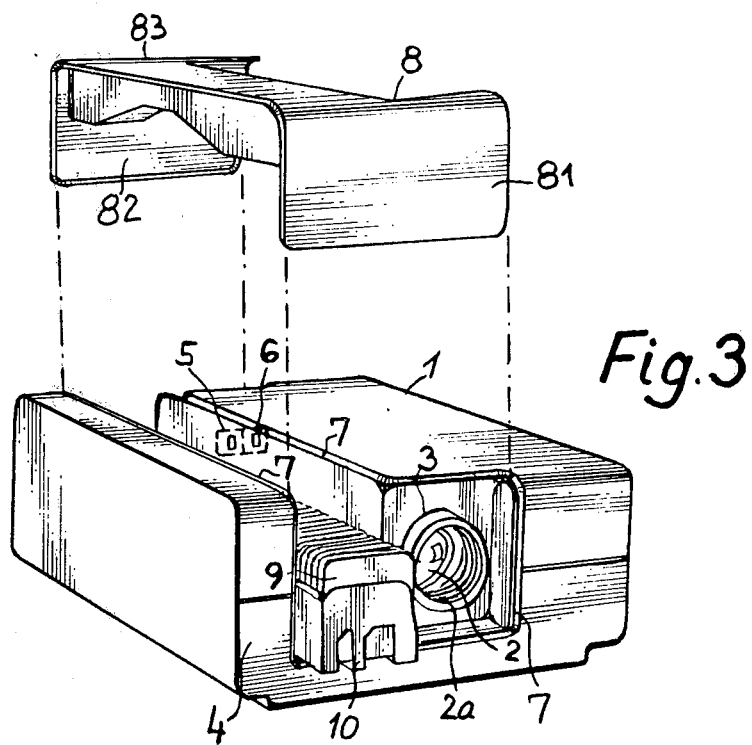
FIG. 3 is an exploded perspective view of the projector FIG. 1 with the cover removed.

Cover 8 includes a first plate 81 that covers projection lens 2 and the forward end of the magazine guide or channel 4 when cover 8 is fitted into recess 7. A second plate 82 of cover 8 is opposite plate 81 and covers the other end of the magazine guide or channel 4 and manual switches 5 and 6. A panel 83 extends between plates 81 and 82 and covers the top of the magazine channel and lies flush with the flat top of housing 1. Panel 83 has a projection that extends downward into the magazine guide channel and is shaped to be positioned closely above the upper edges of slides 9 in magazine 10 as best shown in FIG. 2. The illustrated projector has a slide lifting ramp 11 that raises slides 9 up to an elevated position on the slide changing plane, and the downwardly extending projection of panel 83 is contoured to correspond with slide lifting ramp 11 to be positioned closely above the upper edges of slides 9 that are elevated by slide lifting ramp 11.

Cover 8 then securely holds slides 9 in place within a magazine 10 within the projector so that a magazine full of slides can be transported with the projector when cover 8 is secured in place. Cover 8 is preferably formed as a single piece, and is preferably injection molded of plastics material and shaped to fit into recess 7 to be smooth and flush with the external contour of housing 1 so that the closed projector has flat and smooth surfaces all around its exterior with no openings to expose components.

What is claimed is:

1. A still projector having a housing, a projection lens extending slightly outward from an aperture in said housing, a magazine guide parallel with said projection lens and formed in an open channel in said housing, and at least one manual switch for an electrical system of said projector, said projector comprising a cover, said cover being shaped to enclose said projection lens, said magazine guide channel and said switch, said housing having a recess shaped to receive the perimeter of said cover, said cover being shaped to fit in said recess and be retained on said projector, said cover being manually insertable into and removable from said recess, said cover having a first plate covering said projection lens and one end of said magazine guide channel, and having a second plate opposite said first plate and covering the other end of said magazine guide channel and said switch, and having a panel extending between said first and second plates and covering the top of said magazine guide channel, said panel having a projection extending downward into said magazine guide channel and shaped to be positioned closely above the upper edges of slides in a magazine in said magazine guide.

2. The projector of claim 1 wherein said magazine guide has a slide lifting ramp and said projection of said panel is shaped to be positioned closely above the upper edges of slides elevated by said slide lifting ramp.

3. The projector of claim 2 wherein said cover is formed in a single piece and is shaped to fit the external contour of said housing.

* * * * *